United States Patent [19]

Bartusel et al.

[11] Patent Number: 4,661,142
[45] Date of Patent: Apr. 28, 1987

[54] FRAME FOR SUPPORTING A GLASS SHEET DURING TEMPERING

[75] Inventors: K. Rudolf Bartusel, Stolberg; Werner Diederen, Herzongenrath; Eberhard Liepelt, Stolberg; Waldemar Linberg, Herzogenrath, all of Fed. Rep. of Germany

[73] Assignee: Saint-Gobain Vitrage, Aubervilliers, France

[21] Appl. No.: 791,971

[22] Filed: Oct. 28, 1985

[30] Foreign Application Priority Data

Oct. 29, 1984 [FR] France ................................. 84 16482

[51] Int. Cl.⁴ ..................... C03B 27/04; C03B 25/035
[52] U.S. Cl. ........................................ 65/348; 65/107; 65/114; 65/287; 65/351
[58] Field of Search ................ 65/107, 114, 287, 288, 65/289, 348, 351

[56] References Cited

U.S. PATENT DOCUMENTS 2,032,008  2/1936  Galey ................................. 65/348
3,973,943  8/1976  Seymour ........................... 65/348

FOREIGN PATENT DOCUMENTS 505189  5/1939  United Kingdom ................. 65/114

Primary Examiner—Arthur Kellogg
Attorney, Agent, or Firm—Pennie & Edmonds

[57] ABSTRACT

The invention relates to a frame for supporting a glass sheet in horizontal position during tempering. The frame is formed by a body and includes bearing members with bearing surfaces which support the glass sheet and which between them delimit channels for evacuation of blowing gases. The bearing members are located in at least a selected region of the body.

11 Claims, 4 Drawing Figures

FRAME FOR SUPPORTING A GLASS SHEET DURING TEMPERING

TECHNICAL FIELD

The invention relates to a frame for supporting a glass sheet in a horizontal position during a tempering process. The frame has a shape suited to both the contour and shape of the glass sheet. Bearing members located on an upper face of the frame support the glass sheet, and channels between the bearing members permit evacuation of blowing gases following impingement upon the lower face of the glass sheet during tempering.

BACKGROUND OF THE INVENTION

In general, frames for supporting a glass sheet in a horizontal position are known, and currently used in various processes in the production of a glazing for a motor vehicle. In one known embodiment, the frame is formed by metal flats placed edgewise to provide bearing surfaces for the glass sheet. The bearing surfaces are provided with grooves forming evacuation channels. According to another embodiment, the frame is formed by flats placed horizontally. According to this embodiment, the flat surfaces of the flats substantially correspond to the shape of the glass sheet to be supported. The support instrumentality comprises a plurality of pins in horizontal position which support the glass sheet. The horizontal pins are provided on the inwardly directed edge of the flats.

The evacuation channels, between the edge of the glass sheet and frame, should be of sufficient section to assure a perfect tempering of the glass sheet even within the region of its edges. On the other hand, the distance between bearing surfaces should not be too great, because the placing of the glass sheet on different points with a too great distance leads to a optically disturbing deformation of the marginal zones of the glass sheet which is heated to its deformation temperature.

It has been found that the known frames cannot satisfy the two important requirements of perfect tempering within the marginal zones while, at the same time, and within those zones, avoiding substantially all optically disturbing deformation that may occur. In an attempt to satisfy these requirements, frames for use in the process of tempering of glass sheets oftentimes are covered with a fine mesh metal netting. The purpose of the netting is to multiply and equalize the points of contact of the glass sheet on the frame. It is also thought that the netting would provide a favorable influence for evacuation of the blowing air. It has been found, however, that the frame with a mesh leads to certain drawbacks. One particular drawback is that the mesh unfavorably influences the optical quality of the marginal zones of the glazing because the mesh has the very definite tendency to warp during in the tempering process.

SUMMARY OF THE INVENTION

It is a primary aspect of the invention to provide a frame having a particular use in supporting a glass sheet in a horizontal position during tempering, and capable of satisfying the important requirements of perfect tempering. Thus, the frame of the invention overcomes the ocurrence of undesirable, optically disturbing deformation of the marginal zones of the glass sheet caused by the bearing surfaces. The frame of the invention, also, leads to a sufficient, homogeneous tempering of the glass sheet, including the marginal zones of the glass sheet. According to the invention perfect tempering of glass is obtained by a frame including several rows of bearing members. The bearing members and their bearing surfaces are located in at least a selected zone of the frame, and there are evacuation channels located between the bearing members. The evacuation channels form a continuous network.

In an embodiment of the invention, one which has proven satisfactory in numerous cases, the frame is equipped with bearing members only on a section of the frame. It is within that section where the requirements are greatest in regard to the optical qualities of the edge of the glass sheet. The edge of concern normally is the upper edge of a retractable motor glazing which becomes visible when the glass sheet is moved in a lower position. The lower edge of the retractable glazing poses less severe requirements as to optical quality and deformations of the glass sheet, because, the lower edge of the retractable glazing is not visible. The invention envisions, under circumstances that the entire periphery of the glass sheet is to be visible, that the bearing members of the frame and their bearing surfaces will be coextensive with the entire periphery of the supporting frame.

The invention is based on the discovery that optically disturbing deformations and optical defects observed in the marginal zones of the glass sheet have their genesis not only in the condition of the support of glass sheet on the frame, which is unfavorably affected by the easily deformable metal mesh covering of the prior art, but that these optically disturbing deformations and optical defects have their genesis also in the conditions of evacuation of air between the frame and bearing members and edges of the glass sheet. Thus, importantly, the invention avoids the use of inserts which are permeable to air and located between the frame and glass sheet. As such, there is no instrumentality present in that location which will uncontrollably deform and transmit its deformation to the glass sheet. The invention, also, provides that the blowing gas which impinges on the glass sheet during tempering is evacuated between the frame and edge of the glass sheet in as homogeneous a manner as possible.

The invention in the frame may be embodied by providing (as seen in the radial direction) at least two rows of bearing members, each bearing member being located in spaced, side by side relation, with the bearing members in successive rows being staggered from the bearing members in adjacent rows. This staggered arrangement of bearing members has been found particularly advantageous. In this manner it has been possible to prevent formation of evacuation channels following the radial direction to avoid or at least substantially reduce the possibility of creation of an alternating cooling effect. Such an alternating cooling effect leads particularly to different tempering degrees, causing optical defects which may be observed in the marginal zones of the glass sheet. On the other hand, the staggered arrangement of bearing members has been effective in obtaining a more homogeneous cooling of the marginal zones of the glass sheet.

According to a very advantageous practical development of the invention, the frame is provided with a number of bearing members in the radial direction. The bearing members are laterally staggered in relation to one another, providing channel-shaped intervals therebetween. The channel-shaped intervals between bearing members extend obliquely and form a continuous evacuation network. The bearing members, more particularly, are arranged in a manner such that preferential directions of flow, that is, preferred channels for the evacuation of air if developed at all are not developed in the radial direction. According to the invention, the bearing members are arranged so that any preferential directions of flow that are developed are developed at an angle between 30° and 60°, and preferably at an angle of about 45°.

The bearing members should be located to represent obstacles to the evacuation of blowing gases. In this manner, the gas currents are forced to branch into a plurality of crossed channels and cool the edge of the glass sheet as uniformly as possible. The bearing members should also exhibit a sufficient laying surface for the support of the glass sheet and the bearing members should be arranged with sufficient separation to provide good evacuation of the blowing gas. Good results in tempering have been realized when the surface of the glass sheet above the intervals between the bearing members is at least equal to, and preferably up to about four times greater than the surface of the glass sheet supported by the laying surface of the bearing members.

Other aspects and advantages of the invention will become clear as the description to be read in conjunction with a consideration of the drawing continues.

BEST MODE FOR CARRYING OUT THE INVENTION

Frames of the general type as disclosed herein are used to convey glass sheets immediately after bending to a tempering device. Typically, the tempering device will comprise two blowing boxes with nozzles or openings directed toward opposite surfaces of the glass sheet for sudden cooling and tempering of the glass sheet.

Figure 1:
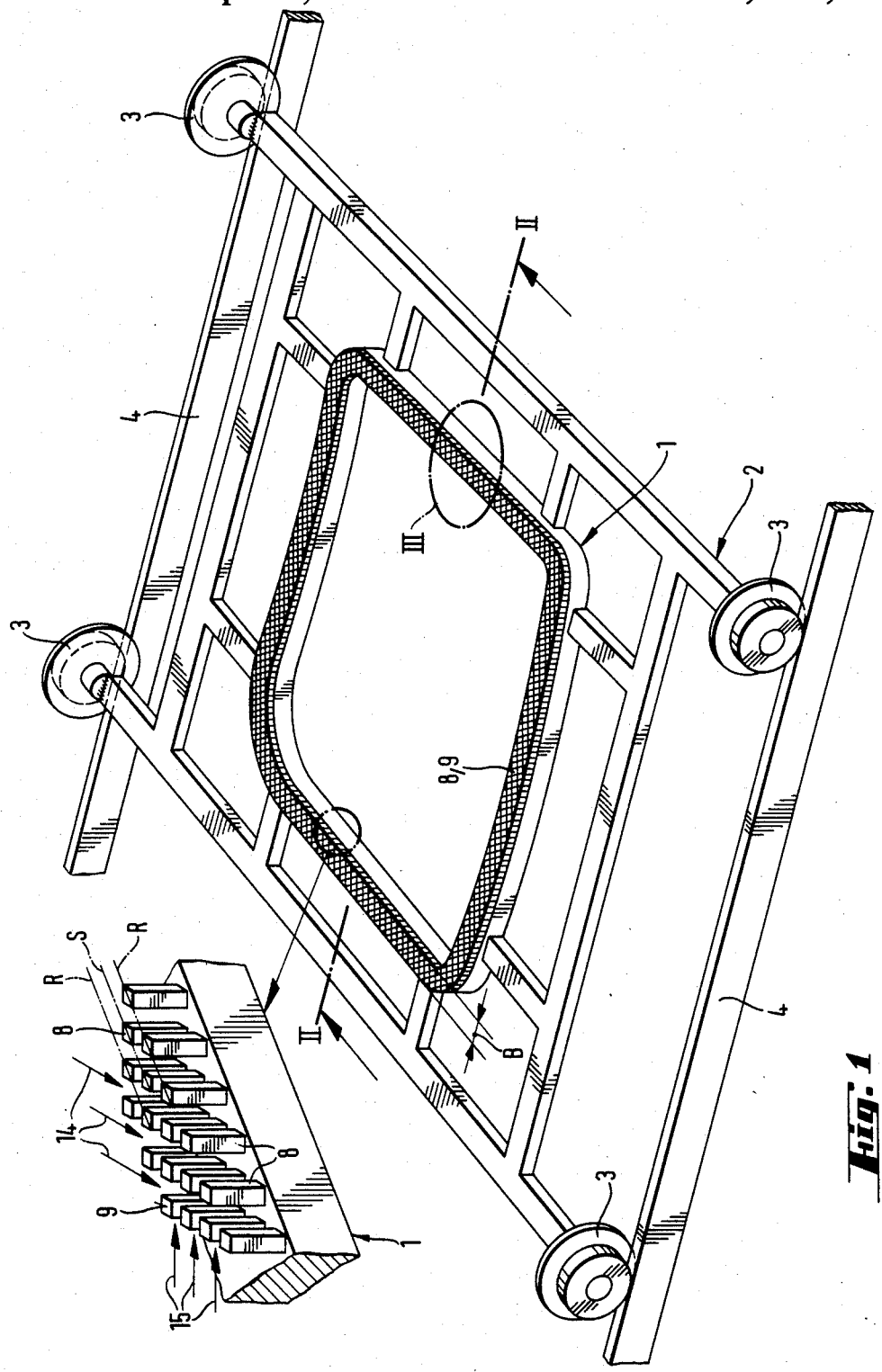
FIG. 1 is a perspective view of a frame mounted on a mobile carriage.
Figure 2:
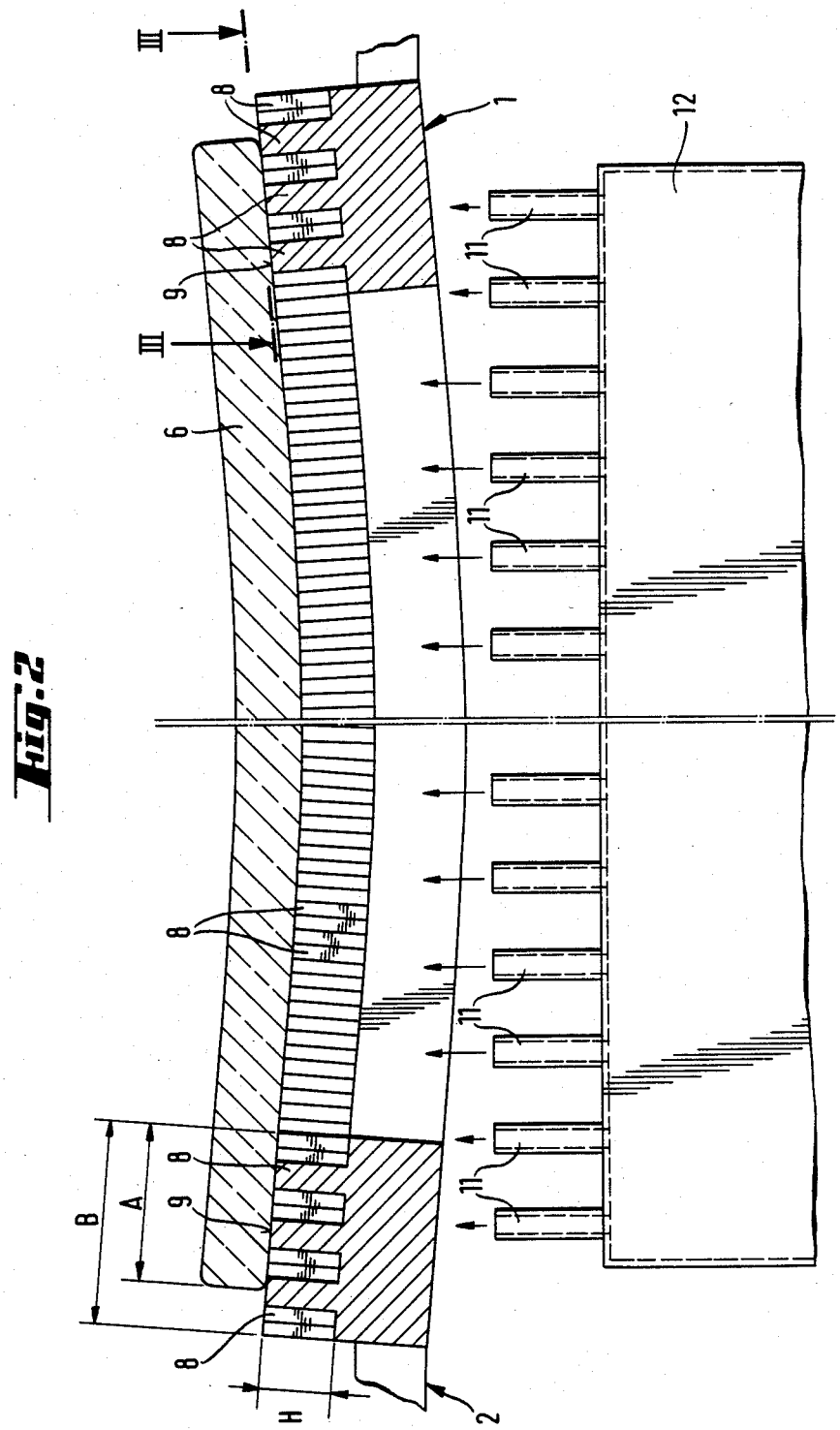
FIG. 2 is a view in section as seen along line II—II of FIG. 1.

Frame 1 of the invention to be discussed more particularly as the description continues, is used to convey glass sheets 6 (see FIG. 2) from an upstream station to a tempering station, and ultimately to a discharge station at which the glass sheet is removed from the frame. A carriage 2 (see FIG. 1) supports the frame and moves the frame as previously discussed. To this end, the carriage is equipped with wheels 3 which move along rails 4 extending from the tempering station in both an upstream and downstream direction. A control means (not shown) controls movement of the carriage along its path of movement.

Glass sheets 6 as received by frame 1 may previously have been bent in the upstream station by a bending press or any other means. It is also contemplated that the frame may itself be used as a bending form. Accordingly, the glass sheet may be lifted by frame 1 and pressed against a bending surface having a shape corresponding to that of frame 1. Further still, the frame may be used in a manner whereby the glass sheet, heated to its bending temperature is released (in horizontal position) from a height on the frame. These bending processes are well known. And, the frame may be used to convey a glass sheet through both a heating and bending furnace and the tempering station related thereto. The frame may be used also to bend and to temper a pair of glass sheets for making a bent laminated glass sheet. In short, the frame of the invention may be used independently of the bending process applied and it may be used for tempering plane glass sheets.

Frame 1 preferably is of a sturdy relatively massive design to reduce, if not totally overcome any danger of deformation of the frame due to thermal or mechanical stresses. The frame may be fabricated in a single piece or may be made up of several segments assembled in the form closed ring. Frame 1 is formed of a material which lends itself to very precise working to obtain a desired shape of bearing surface. The materials for certain uses of the frame should exhibit a relatively low thermal conductivity because of difficulties which may arise with good heat conducting materials under the circumstance that a glass sheet heated to a high temperature is laid on a frame which is at a relatively low temperature. The frame may be formed of ceramic materials capable of being worked with machining tools, or certain special iron and steel alloys likewise capable of being worked and having slight thermal conductivity. INVAR (registered trademark) refractory steel, an alloy with 36% nickle, has been used successfully.

A plurality of bearing members 8 in a uniform, and somewhat dense arrangement are formed on the upper surface of the body of frame 1. The bearing members are directed vertically upward and their upper surfaces collectively form the laying surface for the edge of the glass sheet 6. In most cases, it will suffice that the glass sheet rest on the laying surface of each bearing member located along one edge of the frame, only, over a width A of about 10 to 15 mm. A width B of the bearing part of frame 1, formed by a group of bearing members 8 is of slightly greater width than width A covered by the glass sheet. The width B is for instance 15 to 25 mm. The bearing member 8 may have a height of between about 2 and 10 mm. The bearing members are arranged in a manner whereby the intervals therebetween provide a network of channels for purposes of evacuation of cooling air emanating from blowing nozzles 11 of lower box 12 and directed toward the lower surface of glass sheet 6 (see FIG. 2).

Figure 3:
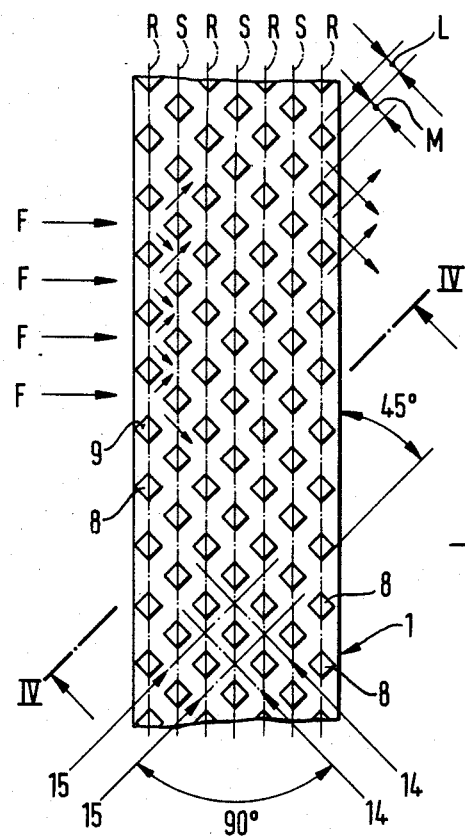
FIG. 3 a copy plan view of the frame on a larger scale as seen within section III in FIG. 1; and, FIG. 4 is a view in section as seen along line IV—IV in FIG. 3.
Figure 4:
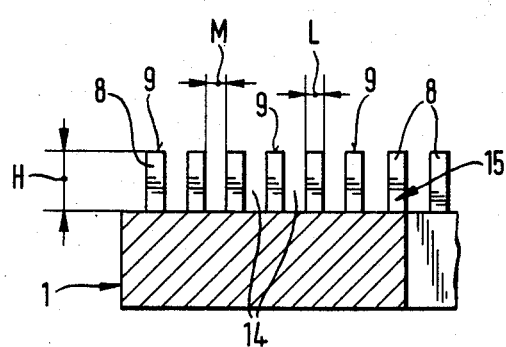

Referring to FIGS. 3 and 4, there is illustrated an arrangement of bearing members to obtain as nearly as possible homogenous cooling of the edges of the glass sheet 6 within the laying zone. To this end, consecutive rows R and S of bearing members 8 are placed one after the other in the direction of movement of the air current (arrow F). As illustrated, the rows are positioned such that each bearing member of row S is disposed in the extension of a gap between the bearing members 8 of row R. The arrangement effectively acts upon the gases of evacuation moving in the direction of arrow F, the original direction of radial flow, by presenting obstacles to its movement, forcing the gases of evacuation into the network of channels formed by the channels 14,15. The channels intersect at an angle and there is a constant distribution of gases at each branching. The channels are located at an angle of between 30° and 60°, and preferably at an angle of 45° in relation relative to the tangential direction of the corresponding frame section. The channels may be formed by milling the body of the frame with a suitable milling machine.

Good results in the tempering of glass sheets 6 are obtained with frame 1 of the invention having bearing members 8 with a height H between 3 and 6 mm, and a bearing or laying surface of approximately square section on the order of 2 to 10 mm$^2$. Preferably, the square section may be on the order of 3 to 6 mm$^2$, with a side value L of about 2 mm. Each channel 14,15, between the bearing members 8 has a width M on the order of 2 mm. As illustrated in FIG. 3, each bearing member can be located so that a line between opposite corners is parallel to directional arrow F. The orientation of bearing members causes the evacuation flow to split, as indicated by the short directional arrows within the region illustrated as the evacuation flow follows the various sub-channels in the channel network. The above criteria provides a relationship of the volumes occupied by the bearing members and flow channels in a ratio of about 1:1 to 1:4 which has been found to provide a sufficient laying surface for the glass sheet 6 and sufficient section for a good evacuation of the blowing gases.

The material of frame 1 used in a process wherein glass sheet 6 heated to its bending temperature is brought in contact with the frame at a relatively low temperature, should be selected from material exhibiting only slight thermal conductivity. Such a selection will avoid too great a cooling of the glass sheet upon and during contact with the frame possibly resulting in breakage of the glass sheet. If it is required or desired to form the frame of a material which exhibits a relatively high thermal conductivity preferably the laying surface of each bearing member should be provided with a ceramic coating. A ceramic coating may be formed, for example, by a known plasma torch spraying process. As previously discussed, however, there are special iron and steel alloys exhibiting only a relatively slight thermal conductivity. Thus, the entire frame may be fabricated from such an alloy, or it may be fabricated of a suitable ceramic compound. Finally, it is contemplated that a plurality of ceramic pins may comprise the bearing members. To this end, it is contemplated that drill holes may be provided in a metal frame body so that the ceramic pins when placed in the drill holes will extend vertically upward.

We claim:

1. A frame for use in supporting horizontally a glass sheet heated to the tempering or deformation temperature during tempering blowing, said frame including a body having a shape substantially conforming to the contour and shape of the glass sheet, a plurality of individual bearing members carried by and extending from the body, said bearing members located in the region of an outer edge of said frame, in at least two successive rows toward the outer edge of said frame and in a selected zone of said frame, each bearing member having a surface upon which the glass is supported, and said bearing members in each row being staggered laterally relative to a bearing member in an adjacent row to form a plurality channels in a continuous, indirect network of passages toward said outer edge of said frame for evacuating the blowing gases which shall have impinged upon the supported face of the glass sheet.

2. The frame of claim 1 wherein said channels formed by said bearing members permit an initial movement of the evacuating gases at an angle of between about 30° to 60° measured along a tangent of the selected zone of said body.

3. The frame of claim 2 wherein the channels formed by said bearing members permit an initial movement of evacuating gases at an angle of 45°.

4. The frame of claim 1 wherein the surface of each bearing member extends substantially within a plane, said surface area of each bearing member being about 2 to 10 mm$^2$.

5. The frame of claim 4 wherein each bearing member has a surface area of about 3 to 6 mm$^2$.

6. The frame of claim 1 wherein each bearing member extends vertically from said body to a height of about 2 to 6 mm.

7. The frame of claim 4 wherein the ratio of area of the surfaces of the bearing members to the area of the channels forming said continuous network is between 1:1 and 1:4.

8. The frame of claim 1 wherein at least the support surface of each bearing member is formed of a material having a relatively low thermal conductivity.

9. The frame of claim 1 wherein said frame comprises metal having a relatively high thermal conductivity and the support surface of each said bearing member are coated with a material having a relatively slight thermal conductivity.

10. The frame of claims 8 or 9 wherein the supports surface of each bearing member is coated with a ceramic.

11. The frame of claim 1 wherein said selected zone within which said plurality of individual bearing members are located extends around the entire periphery of said frame.

* * * * *